(12) United States Patent
Faure et al.

(10) Patent No.: US 9,148,783 B2
(45) Date of Patent: Sep. 29, 2015

(54) METHOD OF MANAGING SENSITIVE DATA IN AN ELECTRONIC TOKEN

(75) Inventors: Frédéric Faure, Roquefort (FR); Jean-Sébastien Paris, Simiane-Collongue (FR)

(73) Assignee: GEMALTO SA, Meudon (FR)

( * ) Notice: Subject to any disclaimer, the term of this patent is extended or adjusted under 35 U.S.C. 154(b) by 456 days.

(21) Appl. No.: 13/140,210

(22) PCT Filed: Oct. 16, 2009

(86) PCT No.: PCT/EP2009/063593
§ 371 (c)(1),
(2), (4) Date: Sep. 16, 2011

(87) PCT Pub. No.: WO2010/069631
PCT Pub. Date: Jun. 24, 2010

(65) Prior Publication Data
US 2012/0030744 A1   Feb. 2, 2012

(30) Foreign Application Priority Data

Dec. 19, 2008   (EP) .................................... 08305985

(51) Int. Cl.
*H04L 9/08*   (2006.01)
*H04W 12/04*   (2009.01)
(Continued)

(52) U.S. Cl.
CPC ........... *H04W 12/04* (2013.01); *G06Q 20/3563* (2013.01); *G06Q 20/3574* (2013.01);
(Continued)

(58) Field of Classification Search
CPC ... H04L 63/0435; H04L 63/06; H04L 63/067; H04L 63/068; H04L 2463/041; H04L 9/08; H04L 9/0816; H04L 9/0838; H04L 9/0861; H04L 9/0863; H04L 9/0869; H04L 2209/09
See application file for complete search history.

(56) References Cited

U.S. PATENT DOCUMENTS 5,557,679 A   9/1996   Julin et al.
6,971,025 B1   11/2005   Droege et al.
(Continued)

FOREIGN PATENT DOCUMENTS

FR   2 681 165 A   3/1993
WO   WO 93/07697 A1   4/1993
(Continued)

OTHER PUBLICATIONS

Ahn et al, Registration method for electronic commerce, involves receiving encryption charge card information and electronic password that are decrypted to produce one-time pad key for customer authentication for transactions, Dec. 28, 2000.*

(Continued)

*Primary Examiner* — Eric W Shepperd
(74) *Attorney, Agent, or Firm* — Buchanan Ingersoll & Rooney PC

(57) ABSTRACT

A method of managing data in an electronic token includes an initial step of storing a first data into the electronic token and into a secured site. Secret data, intended to be initialized in the electronic token, is identified. Instructions and a subset of the first data are also identified, wherein the subset allows the secret data to be rebuilt by applying the instructions. A reference identifying the subset is sent to the electronic token. In the electronic token, the secret data is rebuilt from the first data and the reference by applying the instructions.

10 Claims, 2 Drawing Sheets

(51) Int. Cl.
  *G06Q 20/34* (2012.01)
  *G07F 7/10* (2006.01)
  *H04L 29/06* (2006.01)
  *H04W 88/02* (2009.01)
  *H04W 12/02* (2009.01)
  *H04W 4/00* (2009.01)
  *H04W 12/06* (2009.01)

(52) U.S. Cl.
  CPC ............ *G07F 7/1008* (2013.01); *H04L 9/0838* (2013.01); *H04L 63/062* (2013.01); *H04L 63/0853* (2013.01); *H04W 4/005* (2013.01); *H04W 12/02* (2013.01); *H04W 12/06* (2013.01); *H04W 88/02* (2013.01)

(56) References Cited

U.S. PATENT DOCUMENTS

| | | | |
|---|---|---|---|
| 7,023,994 | B1 | 4/2006 | Dupré |
| 8,032,748 | B2 * | 10/2011 | Merrien et al. ............... 713/169 |
| 2004/0059952 | A1 * | 3/2004 | Newport et al. ............. 713/202 |
| 2004/0083391 | A1 * | 4/2004 | De Jong ........................ 713/201 |
| 2007/0232354 | A1 | 10/2007 | Moscovitz et al. |
| 2008/0116261 | A1 | 5/2008 | Gebhardt et al. |
| 2008/0270791 | A1 * | 10/2008 | Nystrom et al. .............. 713/159 |
| 2008/0276090 | A1 | 11/2008 | Merrien et al. |
| 2008/0311956 | A1 | 12/2008 | Taaghol |
| 2009/0282243 | A1 * | 11/2009 | Rose et al. .................... 713/159 |
| 2011/0023103 | A1 * | 1/2011 | Dietrich et al. ................... 726/9 |

FOREIGN PATENT DOCUMENTS

| WO | WO 2006/048051 A1 | 5/2006 |
|---|---|---|
| WO | WO 2006/067037 A | 6/2006 |

OTHER PUBLICATIONS

International Search Report (PCT/ISA/210) issued on Nov. 16, 2009, by the European Patent Office as the International Searching Authority for International Application No. PCT/EP2009/063593.

Written Opinion (PCT/ISA/237) issued on Nov. 16, 2009, by the European Patent Office as the International Searching Authority for International Application No. PCT/EP2009/063593.

* cited by examiner

METHOD OF MANAGING SENSITIVE DATA IN AN ELECTRONIC TOKEN

FIELD OF THE INVENTION

The present invention relates to methods of managing sensitive data in an electronic token. It relates particularly to methods of initializing a secret data in an electronic token. In particular, the present invention is well suited for initializing a secret data in an electronic token intended to be used in machine to machine systems.

PRIOR ART

Electronic tokens are electronic devices with limited resources and a microprocessor. In general, electronic tokens comprise a plurality of memories of different types. For example, they may comprise memory of RAM, ROM, EEPROM or Flash type. Smart cards, and particularly SIM cards, are electronic tokens.

There is a need for using electronic tokens in the Machine to Machine domain, also named M2M domain. M2M domain requires hardware and software components able to run in environment conditions covering a large scope and during a long time.

M2M domain uses wireless modules which are integrated in systems for providing M2M communicating services. The wireless modules may comprise electronic tokens such as SIM cards which may be welded to the wireless modules at an early stage of the SIM card lifecycle. Welding an already personalized SIM card implies anticipation in the value chain of the mobile network operator selection and logistic issues. When a SIM card is welded to a wireless module in a non-personalized state, secret data which is compulsory for the SIM functions may remain in a virgin state. In other words, the secret data may remain in a state which is not initialized. In particular the couple IMSI/Ki as defined by GSM standards may remain with undefined value.

As the SIM card may be soldered into a wireless device, the future usage of the wireless device and of the associated SIM card may not be known at welding stage. The mobile network operator, also named MNO, which will be assigned to the SIM card may be defined at a late stage of the wireless device lifecycle.

It is known to initialize and activate secret data related to SIM features through post-allocation mechanism as defined by the patent application WO2006/067037. For business reasons, such an initialization of secret data in an electronic token may be carried out in a site having a low security level. In such a case, a mechanism where the secret value is sent to an electronic token has a security level which is considered as not satisfactory. Security level is still too low even if only a part of the secret value is sent or even if the secret value is encrypted and sent through a secured channel.

SUMMARY OF THE INVENTION

An object of the invention is to solve the above mentioned technical problem.

The object of the present invention is a method of managing sensitive data in an electronic token. The electronic token is intended to comprise subscriber identification data allowing connecting a Telecom operator network. The method comprises the steps of:
a) storing a first data into the electronic token,
b) storing said first data into a secured site,
c) identifying a secret data intended to be initialized in the electronic token,
d) in the secured site, identifying instructions and a subset of the first data, said subset allowing rebuilding the secret data by applying the instructions,
e) identifying a reference allowing to identify said subset,
f) sending the reference to the electronic token,
g) in the electronic token, rebuilding the secret data from the first data and from the reference by applying the instructions.

Advantageously, the method may comprise the further step of storing the secret data in a targeted object, said targeted object being defined by an identifier, wherein said identifier is preset in the electronic token or is sent to the electronic token.

The instructions may be preset in the electronic token or may be sent to the electronic token.

The electronic token may comprise an operating system and an application. The first data may be randomly generated outside the electronic token or may be made of third data stored in the electronic token. The third data may be intended to be used by the operating system or by the application for a treatment different from a generation of a secret data.

Another object of the invention is an electronic token intended to comprise subscriber identification data allowing connecting a Telecom operator network. The electronic token comprises a first data and is intended to comprise instructions and is intended to receive a reference. The reference allows identifying a subset of said first data. The electronic token comprises a means capable of building a secret data from the first data and from the reference by applying the instructions.

Advantageously, the secret data may be stored in a targeted object wherein the targeted object is defined by an identifier. The identifier may be preset in the electronic token or may be sent to the electronic token.

The instructions may be preset in the electronic token or may be sent to the electronic token.

Advantageously, the electronic token may comprise an operating system and an application. The first data may be randomly generated outside the electronic token or may be made of third data stored in the electronic token, wherein said third data is intended to be used by the operating system or by the application for a treatment different from a generation of a secret data.

The electronic token may be intended to be connected to a device able to establish a wireless channel with a remote machine for machine to machine service.

Another object of the invention is a system comprising a secured site and an electronic token. The secured site comprises a first data. The electronic token comprises said first data and a subscriber identification data allowing connecting a Telecom operator network. The electronic token is intended to comprise instructions and intended to receive a reference allowing identifying a subset of the first data. The electronic token comprises a first means capable of building a secret data from the first data and from the reference by applying the instructions. The secured site comprises a second means able to identify the instructions and the reference corresponding to the secret data, the reference allowing identifying said subset.

Another object of the invention is a wireless device comprising the above described electronic token.

Advantageously, the electronic token may be soldered to the wireless device.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of electronic token intended to connect to a telecom operator network.

The present invention relies on the fact that no part of the secret value is sent to the electronic token when the electronic token is outside a high security level site. According to the invention a recipe and reference to a data which is already stored in the electronic token are sent to the electronic token. The recipe allows the electronic token to build the secret value from data already stored in the electronic token. Firstly the secret value is identified outside the electronic token then the electronic token rebuilds the identified secret value.

An advantage of the invention is to allow a secure initialization of secret data in an electronic token where said secure initialization complies with high secure requirements. In particular, the method of managing sensitive data according to the invention complies with the requirements of the Memorandum of Understanding (MoU) of the GSM Security Accreditation Scheme (SAS) versions 3.1.0, 3.2.2, 3.2.4 and furthers.

Another advantage of the invention is to provide a secured solution for switching the electronic token from a MNO to another one when the electronic token is on the field. MNO subscription switching may be achieved using the setting of new secret data in the electronic token according to the invention.

Figure 1:
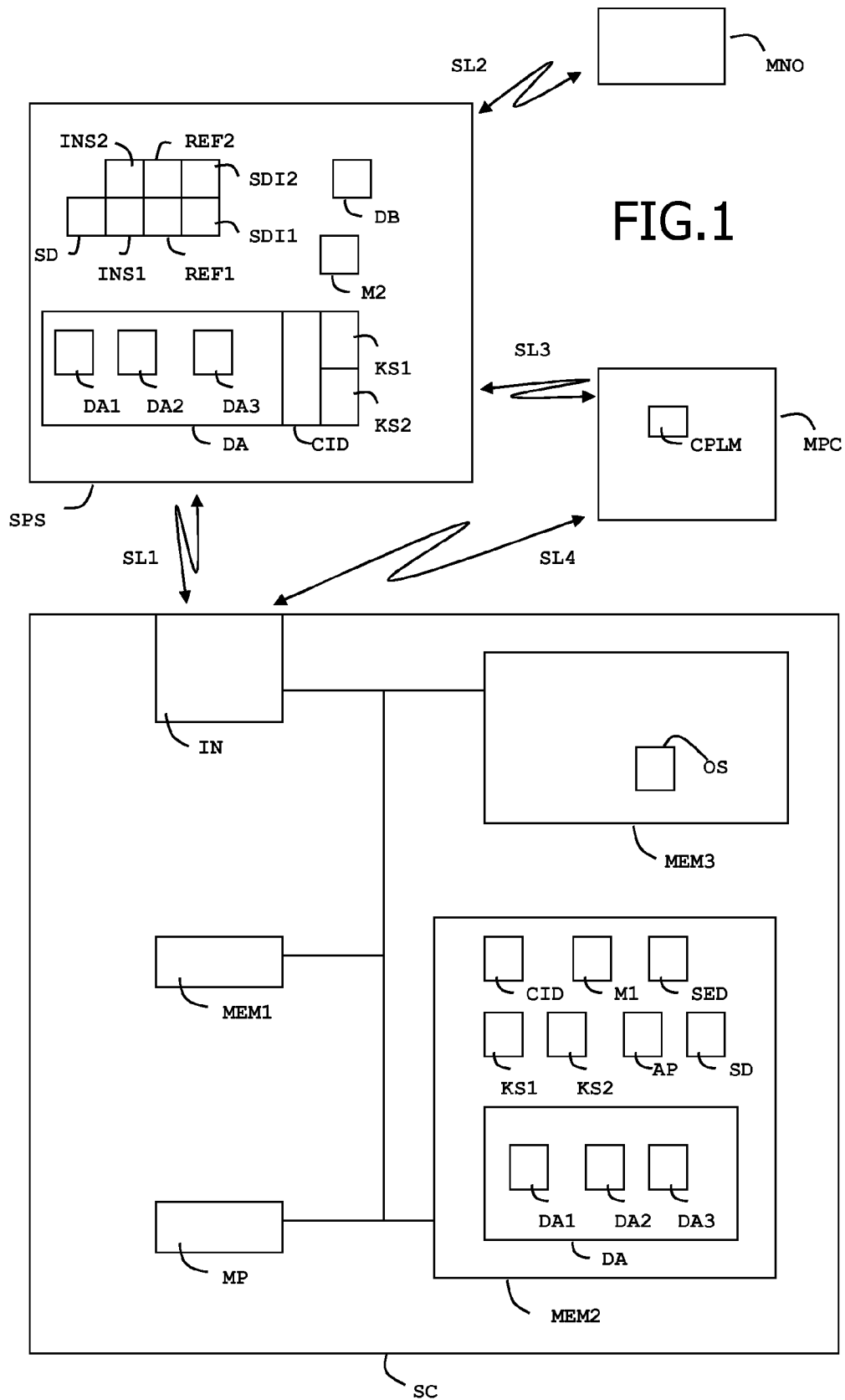
FIG. 1 depicts schematically an example of architecture of an electronic token according to the invention.

FIG. 1 shows the architecture of an electronic token SC of SIM card type according to a preferred embodiment of the invention and the links between involved actors. The portable electronic device SC is intended to be connected to a wireless device allowing communication exchanges in particular for M2M domain.

The portable electronic device SC comprises a working memory MEM1 of RAM type, two non volatile memories MEM2 and MEM3, a microprocessor MP and a communication interface IN. The non volatile memory MEM3 comprises an operating system OS.

The non volatile memory MEM2 comprises a card identifier CID, a data DA, a means M1, two key sets KS1 and KS2, and a security domain SED as defined by the GlobalPlatform v2.x standard.

In this example, three subsets DA1, DA2 and DA3 belong to the data DA.

The two memories MEM2 and MEM3 may be implemented as any combinations of one, two or more memories. These memories may be NAND flash or EEPROM memory or another type of non volatile memory.

The SIM card SC is intended to exchange messages with a wireless device through the communication interface IN. The wireless device is not drawn in FIG. 1.

In a preferred embodiment, the SIM card SC is a Java Card and the means M1 is implemented as an applet. The applet M1 is able to build a sensitive data SD from the data DA and a specific command comprising a reference to one or several subsets of data DA.

A secured personalization site SPS comprises the same data DA which comprises the three subsets DA1, DA2 and DA3. The secured personalization site SPS comprises the card identifier CID associated to the data DA and two key sets KS1 and KS2 associated to the data DA. The secured personalization site SPS also comprises the two triplets made of a secret identifier SDI1, respectively SDI2, reference REF1, respectively REF2 and instructions INS1, respectively INS2. These two triplets are associated to the card identifier CID. The references REF1 and REF2 correspond to at least one subset of data DA. For example, reference REF1 may correspond to the subset DA1 and reference REF2 may correspond to the two subsets DA2 and DA3. Each of the two triplets corresponds to a secret value to be initialized in the electronic token having a card identifier equal to CID.

Figure 2:
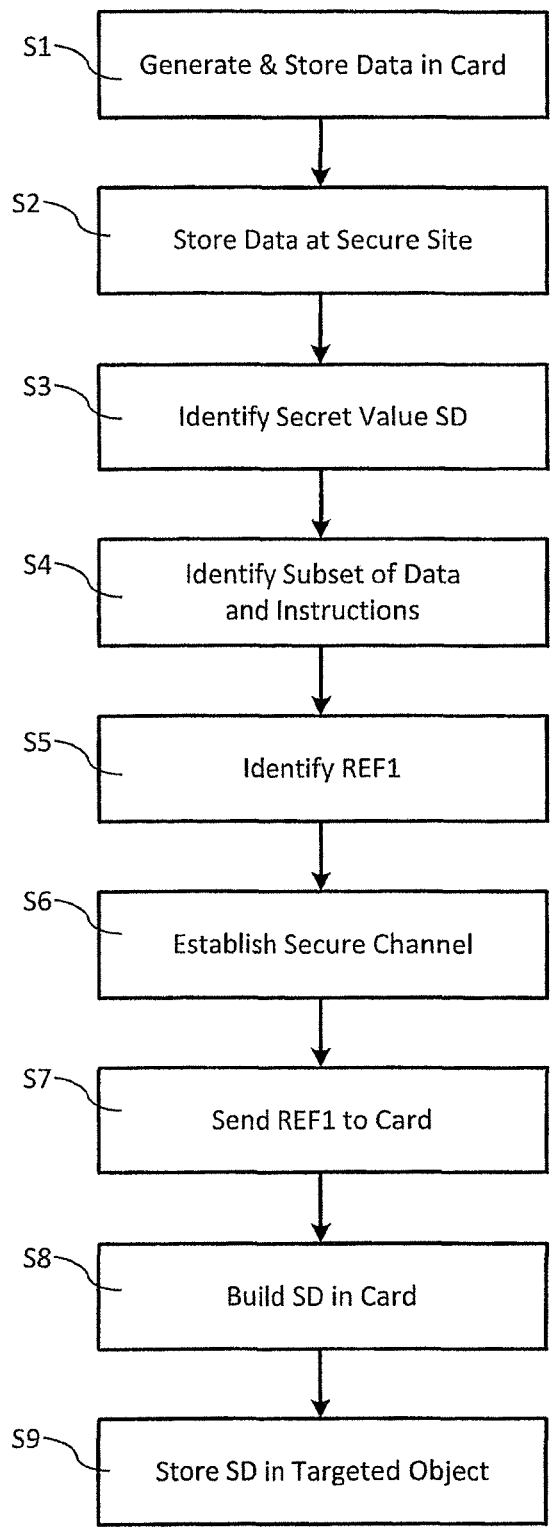
FIG. 2 is an example of step sequence for initializing a secret key in an SIM smart card according to the invention.

FIG. 2 shows an example of a step sequence for initializing a secret key in an electronic token according FIG. 1. In this example the electronic token is a SIM card.

First a buffer of data DA is generated then loaded and stored into the SIM card SC at step S1 in a secured personalization site SPS. At step S2, the buffer of data DA is stored into the secured personalization site SPS. An identifier of the SIM card may be associated to the data DA and stored in the site SPS. Preferably, data DA and the card identifier are stored into a database in the secured personalization site SPS. At step S3, a secret value SD is identified. The secret value SD is intended to be used for initializing and activating a targeted secret object in the electronic token SC. In this example, the targeted secret object is a secret key. The secret value SD is intended to be stored into the secret key in the SIM card SC. At step S4, the site SPS identifies a plurality of subsets DA1, DA2 belonging to data DA and identifies instructions INS1. The subsets DA1 and DA2 allow building the secret value SD by applying the instructions INS1. The site SPS comprises a dedicated means M2 which is able to identify the relevant subsets DA1 and DA2 and the associated instructions INS1. The means M2 may be implemented as a software in a computer machine.

Then at step S5, the means M2 identifies a reference REF1 corresponding to the two subsets DA1 and DA2. For each subset, the reference REF1 may comprise an offset and a length, where the offset corresponds to the beginning of the subset in DA. At step S6, a secure channel is established between the site SPS and the SIM card SC through a Personalization center MPC. The secure channel may be a secure session between the site SPS and the card SC where the center MPC has a proxy function. Alternatively the secure channel may be a combination of two secure sessions: a first secure session between the site SPS and the center MPC and a second secure session between the center MPC and the card SC. Then the reference REF1 is sent to the SIM card SC at step S7. At step S8, the SIM card SC rebuilds the secret value SD from the reference REF1 and from data DA by applying the instructions INS1. In this case the instructions INS1 are supposed to be already known by the means M1 of SIM card SC. For example instructions INS1 may implicitly consist of extracting and concatenating the two subsets DA1 and DA2.

At step S9, the rebuilt secret value SD is stored in the secret key which is the targeted secret object. In this example, the identification of the targeted secret object is supposed to be already known by the SIM card SC. For example the targeted secret object may be the GSM authentication key Ki.

Alternatively, the data DA is generated in the secured personalization site SPS so as to be a series of random values which may be used as secret values for initializing secret objects. The data DA is then composed of the juxtaposition of several random values. This embodiment allows using only one subset of DA for each secret object to be initialized. In particular the subset may correspond to one of the random value. Advantageously, each generated random value may comply with mathematical criteria in order to increase security of secret object which uses such random value.

Thus the identification of the secret value may be carried out by selecting one of the random values in data DA.

Another detailed embodiment of the invention is presented below.

At first the SIM card SC is personalized in a manufacturing plant compliant with the GSM SAS MoU requirements. In this case, the manufacturing plant is the secured personalization site SPS. The following operations are executed for the token SC through a first channel SL1:

the UICC/SIM file system and applets are loaded and instantiated in the SIM card SC.

The applet M1 is loaded and instantiated inside the SIM card SC.

A card identifier CID is loaded inside the SIM card SC.

a Transport key set KS1 for file creation and a transport key set KS2 for secret activation are generated and loaded inside the SIM card SC.

A data buffer DA is randomly generated and loaded in the SIM card SC. The security access of data buffer DA is set to READ NEVER with only an exception for the applet M1 which can read the data DA. For example, the data DA may be stored in a file or in a variable of the applet M1.

The set data DA, key set KS1, key set KS2 and identifier CID are stored in the secured personalization site SPS. In a preferred embodiment these data are recorded in a database.

The card security level is set to OP SECURED mode according to GlobalPlatform ° standard.

At this stage, the SIM card SC has been personalized using the issuer profile. In other words, the SIM card is still not diversified according to MNO requirements.

The first channel SL1 may correspond to a communication session between a personalization reader and the SIM card SC. The first channel SL1 is a secure channel since it fully takes place in the secured personalization site SPS. Alternatively, the first channel SL1 may be established with a secure session requiring authentication between the reader and the card SC.

The card SC is sent to a M2M personalization center MPC. In this example, the center MPC does not comply with GSM SAS MoU requirements. The card may be then soldered into a M2M wireless device.

Advantageously, when several electronic cards have to be managed, the size of the data buffer DA is the same for all the cards and a unique identifier CID is associated to each card. In this case, SIM cards may be managed through batch.

Secondly, the MNO sends an order for subscription personalization for a given SIM card or for a batch of SIM cards through a secure channel SL2. The order for subscription personalization is received by the site SPS. The order of the MNO may be associated with a specifications file corresponding to MNO requirements also named BAP specifications file. Then the SPS sends to the personalization center MPC an identifier of the order for subscription personalization. The center MPC requests to the site SPS a remote personalization of the targeted MNO subscription order using this identifier. For example, the MNO may ask for the initialisation of two secret objects ADM and Ki in the SIM card SC where ADM is the Administration secret code and Ki is the Authentication Key as defined by telecom standards.

In the site SPS, the card identifier CID allows to retrieve the corresponding key sets KS1 and KS2 and data DA which are associated to the SIM card SC.

When a remote personalization is requested by a site MPC, a machine M2 identifies the secret values to be used then builds a set of commands intended to be sent to the SIM card SC for personalization purpose. The machine M2 belongs to the secured site SPS. Each secret value is selected as being a subset of data DA or the combination of several subsets of data DA. The set of commands is based on key sets KS1 and KS2 in order to comply with authentication and security requirements. The key set KS1 is used for generation of commands related to file creation and to non sensitive data update. The key set KS2 is used for generation of commands related to sensitive data update, in particular for the ADM/Ki initialization and activation.

In a first embodiment, the machine M2 generates a command for updating ADM and another one for updating Ki. Both commands comprise an identifier of the targeted secret data to be initialized. Each of the two commands comprises reference to subset of DA and instructions to be applied on the reference. A reference may be a couple made of a start index of the secret value in the data DA and a length or an end index. For example, the command for updating ADM may comprise a reference REF1, the instruction INS1 and the secret identifier SDI1, where reference REF1 defines the subsets DA2 and DA3, the instructions INS1 correspond to a concatenation of DA3 with DA2 and the secret identifier SDI1 defines the ADM code. The command for updating Ki may comprise a reference REF2, the instruction INS2 and the secret identifier SDI2, where reference REF2 defines the subsets DA1 and DA2, the instructions INS2 correspond to a concatenation of DA1 with DA2 and SDI2 defines the targeted secret data as being ki. The two triplet (SD1, REF1, INS1 and SD2, REF2, INS2) may be stored in the site SPS. If instructions are implicit, only two couples (SD1, REF1 and SD2, REF2) are stored in the site SPS.

When the SIM card is to be personalized, the card identifier CID is retrieved from the SIM card by the M2M personalization center MPC. The card identifier CID corresponds to the SIM card SC intended to be customized.

This CID is sent to the site SPS through a secure channel SL3. The secure channel SL3 may be a virtual private network or any secured link able to provide a secure session.

In the site SPS, the set of data corresponding to the CID is retrieved from the database. The means M2 generates the relevant secured command set corresponding to SIM card SC. Then the command set is securely sent to MPC through the secure channel SL3. The M2M personalization center MPC comprises a machine CPLM. The machine CPLM may send the command set to the SIM card through a channel SL4.

It is important to note that the sent commands do not contain any sensitive data as such. The sent commands do not contain any secret code or key value.

Alternatively, a secure session is established between the site SPS and the SIM card SC, via the center MPC. In this embodiment the personalization center MPC acts as a proxy or a relay between the site SPS and the card SC.

Alternatively, a session is established between the site SPS and the SIM card SC, via the Over The Air mechanism or the Global Platform Secure Channel Protocol SCP. The CPLM may be a wireless communicating equipment such as a mobile phone or a wireless module. In this embodiment the SIM card is assumed to be already personalized with a temporary couple IMSI/Ki which is used for performing the OTA communication. The wireless communication may also be carried out through Wifi, GSM or Bluetooth® standard.

When the commands are received in the SIM card SC, the personalization is carried out by the operating system OS which creates the files according to commands secured with KS1. In addition, the sensitive data ADM code and Ki are updated and activated by the applet M1 according to commands secured with KS2.

When the SIM card receives the two commands, the applet M1 extracts and concatenates the secret values defined by DA3 and DA2 and copies the result in the relevant object: the ADM code. Then the applet M1 extracts and concatenates the secret value defined by the DA1 and DA2 and copies the result in Ki. In this first embodiment the means M1 gets the instructions to be applied in the received command. Alternatively the applet M1 may already know the instructions to be applied to the references of subset of data DA. In such a case the instructions may correspond to the copy of a single block of data into the targeted object intended to contain the targeted secret value. In such a case instructions are implicit.

Since data DA has been randomly generated, this first embodiment allows to select an unpredictable value to be used for initializing the targeted secret data.

Advantageously the data DA may comprise at least one of each value in the range [0x0, . . . , 0xF] or in the range [0x00, . . . , 0xFF].

After data processing, the site SPS stores the set made of references, instructions and secret identifier associated to DA and CID. In a preferred embodiment, the site SPS stores the selected secret value SD as such, instead of storing the reference. The site SPS may also store additional data related to the MNO like IMSI and ICCID.

Advantageously, the subsets of DA which are used for initializing the secret objects may be marked as "used" in the SIM card. Such markers may be used for avoiding the use of a same subset for several secret objects initialization in the token SC. Thus markers allow improving the security level of the secret object activation in the electronic token.

Advantageously, at the end of the personalization process, the data DA, the key set KS2 and the applet M1 may be removed from the SIM card SC in order to save memory space.

Then the site SPS may send the secrets value SD associated to the SIM card to the MNO through the secure channel SL2. The secure channel SL2 may be carried out by the Secure FTP mechanism.

In the above-described example the two targeted secrets value ADM code and Ki are referenced by the secret data identifier SDI1 and SDI2. Alternatively, the secret data identifier may be implicit. In this case the commands sent to the electronic token SC do not contain any secret data identifier and the means M1 is able to automatically identify the relevant target secret data to be initialized. This embodiment is useful when there is only one secret data to be initialized in the electronic token or when the targeted secret data is identified according to an additional element. Such an additional element may be the length of the result computed by the applet M1 or the command position in the command set.

In another embodiment, only one subset DA1 belonging to the data DA is used for building the targeted secret value by applying the instructions INS1. For example if the reference REF1 of the subset DA1 comprises a start index X and a length L, the instructions INS1 may correspond to the extraction of L bytes from the offset X in data DA and the copying of the extracted string in the relevant memory area corresponding to the targeted secret object.

Advantageously, instructions INS1 may comprise basic mathematical operation which must be carried out on a subset. This mathematical operation may require an additional parameter. For example a first subset DA1 may be equal to "1234567", the second subset DA2 may be equal to "7" and a third subset DA3 may be equal to "1". The instructions INS1 may correspond to the addition of the second and third subset DA2 and DA3 then the concatenation of the subset DA1 with the result of the addition. In this case the means M1 concatenates "1234567" with "7"+"1" and the generated secret value is "12345678". It is important to note that these basic mathematical operations are different from complex cryptographic operations. These basic mathematical operations do require only low CPU and memory resources and are quickly performed.

This embodiment allows generating any secret value whatever the content of the data DA is. In particular, this embodiment allows rebuilding a secret value corresponding to a given value specified by the MNO. The invention allows generating relevant secret values even if the MNO requests that secret values comply with mathematical constraints. This embodiment is also useful when the MNO generates its own secret value before sending it to the site SPS.

Thus the identification of the secret value may be carried out by seeking part or the whole of a specified string in the data DA.

According to the invention, the means M1 is able to juxtapose data extracted from several memory areas in order to build a secret value SD.

Alternatively, the means M2 may build only one command comprising references allowing rebuilding several secret values instead of generating one command for each secret value.

In another embodiment, the data DA is not stored as such in the site SPS for each token SC. In this case, a second data DB is stored in the site SPS, where the data DB allows retrieving the data DA. For example, the data DB may be a key K associated to an electronic token SC. The key K may be intended to scramble a preset buffer of data. Thus the data DA may be recomputed by scrambling the preset data buffer with the key K and according to a preset algorithm. By storing DB instead of DA, memory space may be saved on SPS since the key K may be shorter than the data DA. The preset buffer of data and the algorithm may be unique for a batch of cards. The preset buffer of data and the preset algorithm are stored in the site SPS. Advantageously the preset buffer of data comprises all digits in the range [0x0, . . . , 0xF].

Advantageously, the data DA may be made of subsets stored in several memory areas of the electronic token SC. In particular, the data DA may be made of data which is extracted from several objects and/or files and/or containers. The data DA may be made of data extracted from the code of the operating system OS, the code of an application AP, the file system or applicative data. In this case, the data DA is not stored in the token SC for the exclusive purpose of building sensitive data value. The data DA reuses bytes which are present in the token for other reasons.

The invention allows initializing a secret value in an electronic token through a wired line for remote personalization purpose when the electronic token is in a site which has a low security level. Moreover the invention allows initializing a secret value in an electronic token which is on the field through Over The Air mechanism as defined by GSM standards. Such secret value initialization is useful for post-allocation or MNO switching purpose. In this case the electronic token SC exchanges messages via the wireless device where the token SC may be soldered.

The invention securely allows initializing all kind of sensitive data, like secret data belonging to a MNO, ADM code, secret key, and secret applicative data.

The invention also allows initializing all kind of non-sensitive data, such as applicative data or MNO card-per-card diversified parameters.

Alternatively, the secret data may be identified in the electronic token in the first place. Then the corresponding reference is sent to the secure site and the secret data is rebuilt in the secure site.

In another embodiment, the invention may be implemented in a software component which provides the same features as the above described electronic token. In this case the software component takes the place of the electronic token. In particular, the invention may be carried out thanks to specific software running on a memory.

The invention claimed is:

1. A method of managing sensitive data in an electronic token, said electronic token being adapted to contain subscriber identification data enabling connection to a Telecom operator network, said method comprising the steps of:
   storing a first data into the electronic token;
   storing said first data into a secured site;
   identifying, by the secured site,
   (i) a secret data, to which a prescribed value is allocated, to be initialized in the electronic token,
   (ii) instructions, said instructions include at least one of a basic mathematical operation and a concatenation operation,
   (iii) at least one subset within said first data stored in both said electronic token and said secured site, said at least one subset enabling the prescribed value of the secret data to be rebuilt by applying the instructions to two or more values of the at least one subset, and
   (iv) a reference, said reference corresponding to the at least one subset of said first data stored in both said electronic token and said secured site;
   transmitting, by the secured site, to said electronic token, said reference;
   receiving, by said electronic token, said reference, from said secured site;
   identifying, by said electronic token, the subset of said first data to which the received reference corresponds; and
   rebuilding, by said electronic token, the prescribed value of the secret data from the identified subset of said first data corresponding to said received reference by applying the instructions of at least one of the basic mathematical operation and a concatenation operation to the two or more values of the at least one subset.

2. A method according to claim 1, wherein said method comprises the further step of:
   storing the prescribed value of the secret data in a targeted object, said targeted object being defined by an identifier, wherein said identifier is preset in the electronic token or is sent to the electronic token.

3. A method according to claim 1, wherein said instructions are sent to the electronic token.

4. A method according to claim 1, wherein the electronic token comprises an operating system and an application, and wherein first data is randomly generated outside the electronic token or is generated from other data stored in the electronic token, said other data being used by the operating system or by the application for a treatment different from a generation of a secret data.

5. The method according to claim 1, wherein said prescribed value is imposed by a Telecom operator.

6. A system comprising a secured site and an electronic token,
   said secured site comprising:
      a memory storing first data; and
      a means to identify (i) a secret data, to which a prescribed value is allocated, (ii) instructions and (iii) a reference, said instructions including at least one of a basic mathematical operation and a concatenation operation and said reference corresponding to two or more values of at least one subset of said stored first data;
   said electronic token containing subscriber identification data enabling connection to a Telecom operator network, said electronic token further comprising:
      a memory storing said first data;
      an interface configured to receive said reference from said secured site; and
      a processor configured to (i) identify the at least one subset of the stored first data, based on said received reference, and (ii) rebuild the prescribed value of the secret data from the two or more values of the at least one subset of said stored first data corresponding to the received reference by applying the instructions of the at least one of a basic mathematical operation and a concatenation operation.

7. The system according to claim 6, wherein the prescribed value of the secret data is stored in a targeted object, said targeted object being defined by an identifier, wherein said identifier is stored in the memory of the electronic token or is sent to the electronic token.

8. The system according to claim 6, wherein the instructions are stored in the memory of the electronic token.

9. The system according to claim 6, wherein the electronic token comprises an operating system and an application, and wherein the first data is randomly generated outside the electronic token or is generated from other data stored in the electronic token, said other data being used by the operating system or by the application for a treatment different from a generation of a secret data.

10. The system according to claim 6, wherein the electronic token is adapted to be connected to a device able to establish a wireless channel with a remote machine for machine to machine service.

* * * * *